United States Patent [19]
Stober et al.

[11] Patent Number: 5,837,105
[45] Date of Patent: Nov. 17, 1998

[54] CO-CURRENT CONTACTING SEPARATION TRAY DESIGN AND METHODS FOR USING SAME

[75] Inventors: Berne K. Stober, Ringoes, N.J.; Raymond M. Sowiak, Newtown, Pa.

[73] Assignee: Mobil Oil Corporation, Fairfax, Va.

[21] Appl. No.: 833,490

[22] Filed: Apr. 7, 1997

[51] Int. Cl.$^6$ .............................. B01D 3/14; B01D 3/26; B01D 3/32; F02M 11/00
[52] U.S. Cl. ................................ 203/40; 95/200; 95/202; 96/188; 202/158; 202/197; 203/99; 261/112.2; 261/114.5; 261/147; 261/114.1
[58] Field of Search ........................ 95/219, 20.2, 198, 95/199, 200; 55/434; 96/188; 202/197, 158, 238; 203/99, 40; 261/112.2, 75, 114.4, 147, 114.5, 114.1, 146; 196/100, 105, 139

[56] References Cited

U.S. PATENT DOCUMENTS

| | | | |
|---|---|---|---|
| 2,047,444 | 7/1936 | Stedman | 261/94 |
| 4,159,817 | 7/1979 | Ikawa | 249/98 |
| 4,255,168 | 3/1981 | Nguyen | 55/85 |
| 4,296,050 | 10/1981 | Meier | 261/112 |
| 4,361,469 | 11/1982 | Trutna | 203/99 |
| 4,376,081 | 3/1983 | Leva | 261/94 |
| 4,698,138 | 10/1987 | Silvey | 203/91 |
| 4,732,585 | 3/1988 | Lerner | 261/114.1 |
| 5,110,325 | 5/1992 | Lerner | 261/118 |
| 5,132,056 | 7/1992 | Lockett et al. | 261/112.2 |
| 5,413,741 | 5/1995 | Buchholz et al. | 261/112.2 |
| 5,454,989 | 10/1995 | Nutter | 261/114.1 |
| 5,683,493 | 11/1997 | Stober | 261/114.3 |

OTHER PUBLICATIONS

Hansen et al., "A Practical Guide to Mist Eliminator Selection", CPI, 1983, 100, 37–38.
Koch Engineering Company, Inc., "Mist Eliminators for entrainment separation", 1984, *Bulletin KME–11*, 6 pages.
Munters Euroform, "DH 5000 Tropfenabscheider (TS 5) Droplet Separator", 8 pages.
Otto H. York Company, Inc., "Mist eliminators for removing mists, sprays and fogs from process streams to . . . raise process efficiency, reduce valuable product loss, increase throughput capacity, improve side draw and overhead purity, prevent downstream corrosion, remove pollutants", 1986, *Bulletin 55*, 1–3, 6–7, and 10.

*Primary Examiner*—Virginia Manoharan
*Attorney, Agent, or Firm*—Woodcock Washburn Kurtz Mackiewicz & Norris LLP

[57] ABSTRACT

A tray design for use in a separation column for distilling or fractionating a feed stream is provided that incorporates co-current contact of the liquid and vapor streams and their subsequent separation on each tray. Located on the trays are a plurality of co-current vapor and liquid contacting sections including a volume of the tray in which vapors and liquid can be in co-current contact. Also located on the trays are a plurality of de-entrainment devices for separating entrained liquids from a vapor stream, the de-entrainment devices having an inner and an outer side, the inner side being adjacent to the co-current contacting sections. The tray design further incorporates a plurality of liquid downcomers, having an upper portion and a lower portion, where the upper portion. of the liquid downcomer is capable of accepting liquid from the outer side of the de-entrainment device of a first tray, and the lower portion of the liquid downcomer is located within the co-current contacting section of a second tray that is vertically lower in the column from the first tray. The trays further contain vapor openings located through the bottom of the trays at a point beneath the co-current contacting sections through which vapors can pass into the co-current contacting section of a tray.

12 Claims, 5 Drawing Sheets

CO-CURRENT CONTACTING SEPARATION TRAY DESIGN AND METHODS FOR USING SAME

FIELD OF THE INVENTION

The present invention relates to the design of separation trays useful in distillation and fractionation columns or towers. More specifically, the present invention relates to separation trays that are designed to achieve co-current contact between the liquid and vapors within a tray and are also designed to efficiently separate the liquid from the vapors within the tray subsequent to the co-current contact.

BACKGROUND OF THE INVENTION

Various research has been conducted with respect to the optimization of designs for distillation and fractionation columns or zones, i.e., a contacting column or zone wherein liquid and vapor phases are counter currently contacted to effect separation of a fluid mixture, as for example, by contacting of the vapor and liquid phases on a series of vertically spaced horizontal trays or plates mounted within the column. The design research has primarily focused on the design of different tray structures to improve the efficiency of the overall separation process. Attempts have also been made to design superior packing materials to be placed within the column to enhance the separation process.

The distillation process as traditionally known in the art is a method for separating the individual components of a mixture by utilizing the differences in their vapor pressure. In particular, in the chemical industry, a variety of tray designs have been developed to increase the efficiency of the mass transfer. Improvements in the design of distillation columns led to the use of different types of packing for filling the insides of such distillation columns. For instance, the packing now in use includes wire mesh packing, sheet metal packing, ceramic packing, glass packing, and synthetic resin packing. Many types of packing have been developed for use in distillation and fractionation columns. In general, these packing materials facilitate contact between the liquid and vapor streams by causing more uniform distribution of liquid and vapor over the surface of the packing. Early forms of structured packing include Stedmen packing, described in U.S. Pat. No. 2,047,444. In general, structured packing refers to packing where individual members have a specific orientation relative to each other and to the axis of the column or tower. Random packing, such as the use of Raschig saddles, is also used in the industry.

One type of packing that is widely used consists of a plurality of corrugated plates that contact each other and are disposed in parallel relationship to the column axis. Corrugated plates of this type can be constructed of different types of material such as sheet metal and woven wire fabric. When the corrugated plates are made of sheet metal, uniform distribution of the liquid over the plates is impeded because the liquid tends to channel along the fold troughs. To improve liquid distribution over the corrugated plates, it is known to use apertures in the plates so that a portion of the liquid flowing along one side of the plate is deflected to the opposite side of the plate as it encounters an aperture. An example of such a plate is described in U.S. Pat. No. 4,296,050 to Meier. A column packing made with corrugations and textured surfaces for improved performance especially under turn down conditions is disclosed in U.S. Pat. No. 5,132,056 to Lockett et al. An improved corrugated plate design to achieve a higher density of plates within a given cross-sectional area of the column to achieve enhanced mass and/or heat transfer between the liquid and vapor streams flowing within the column is set forth in U.S. Pat. No. 5,413,741.

Other types of packing besides the corrugated and textured surface plates include packing that consists of individual packing elements. The efficiency in using such packing elements is generally considered to be increased by providing the elements in a random order such as taught in U.S. Pat. No. 4,376,081 to Leva which discloses an element that has a base that has a surface contour which is generated by the rotation of a two-dimensional curve having reverse curvature through an approximate angle range of from 10 to 180° around a straight line that lies within the plane of the curve. The base of the packing element is further provided with slots and depending tongues. A distillation column packing in the form of a spherical body constructed by assembling a pair of hemispherical members of the same shape and structure wherein each of the hemispherical members includes a suitable number of cutout openings formed on the surface portion thereof is shown in U.S. Pat. No. 4,159,817 to Ikawa.

The concept of co-current contact with the liquid and vapor streams within the overall counter-current flow of these two streams within the column has been suggested to enhance the overall capacity of the separation. One example of this concept is the tray design set forth in U.S. Pat. No. 4,361,469 to Trutna. The column has a plurality of vertically spaced trays each consisting of two vertically spaced rows of strips that are parallel and where the strips of the lower row are centered below the spaces of the upper row, and has a separator above each of the trays consisting of plural vertically spaced rows of upwardly facing channels that are parallel and of which the channels of one row are centered between the channels of the adjacent row or rows, the trays and separators occupying a major portion of the cross sectional area of the tower and the remainder of the cross sectional area of the tower being occupied by liquid downcomers.

Improvements in distillation and fractionation column design are needed to increase the efficiency or capacity of the overall separation process and thereby reduce operating and/or fixed costs. Improved designs preferably would take advantage of the entire volume within the column for use in the separation process and utilize efficient contacting of the phases followed by efficient separation of same.

SUMMARY OF THE INVENTION

A tray design for use in a separation column, such as a distillation or fractionation column, is provided by the present invention, along with methods for conducting a separation process with such a column using the inventive tray design. The tray design of the present invention provides for increased separation efficiency and/or increased separation capacity by more efficiently generating co-current contact between the liquid and vapor streams within an individual tray and also for efficiently separating those two streams following the co-current contact within the tray.

The tray design, in one embodiment, is used in a separation column for distilling or fractionating a feedstream wherein the column contains a plurality of interconnected trays having a tray top and a tray bottom. Located on the trays are a plurality of co-current vapor and liquid contacting sections comprising a volume of the tray in which vapors and liquid can be in co-current contact. Also located on the trays are a plurality of de-entrainment devices for separating entrained liquids from a vapor stream, the de-entrainment devices having an inner and an outer side, the inner side being adjacent to the co-current contacting sections, and the inner and outer sides of the de-entrainment devices being permeable to fluid flow. The tray design further incorporates a plurality of liquid downcomers, having an upper portion and a lower portion, where the upper portion of the liquid downcomer is capable of accepting liquid of the de-entrainment device of a first tray, and the lower portion of the liquid downcomer is located within the co-current contacting section of a second tray that is vertically lower in the column from the first tray. The trays further contain vapor openings located through the bottom of the trays at a point beneath the co-current contacting sections through which vapors can pass into the co-current contacting sections of a tray.

The de-entrainment devices of the present invention can be constructed from various known technologies used to de-entrain liquid droplets from a vapor stream. One example of such technologies include demisters or mist eliminators, such as Chevrontype demisters. Another example of such technologies include mesh pads or woven metal threads. Combinations of these mist eliminator technologies can also be used.

The methods of the present invention can be practiced by using the above identified embodiment of the inventive tray design. In the course of the separation process, liquid flows through a first liquid downcomer and into a co-current contacting section of a first tray. At the same time, vapors are directed through the vapor openings of the first tray and into the co-current contacting section of the first tray, whereby the vapors entrain liquid within the co-current contacting section of the first tray to form a mixed phase fluid that travels upward, in a co-current fashion, through the co-current contacting section of the first tray. This mixed phase fluid is passed through the de-entrainment device of the first tray to thereby separate the entrained liquid from the vapors. Following, this de-entrainment step, the de-entrained liquid is directed from the de-entrainment device of the first tray to a second liquid downcomer and into the co-current contacting section of a second tray that is vertically below the first tray. Also, the de-entrained vapors from the de-entrainment device of the first tray are directed to the co-current contacting section of a third tray that is vertically above the first tray.

DETAILED DESCRIPTION OF THE INVENTION

The present invention provides an improved tray design for use in separation columns, such as distillation and fractionation columns. The tray design provides for co-current contact between the liquid and the vapor phases within the individual, separate, tray sections to improve the overall counter-current separation that takes place within the column.

The particular aspects of the preferred embodiments of the present invention can be understood with reference to the figures where like reference numbers refer to like components of the tray design.

Figure 1:
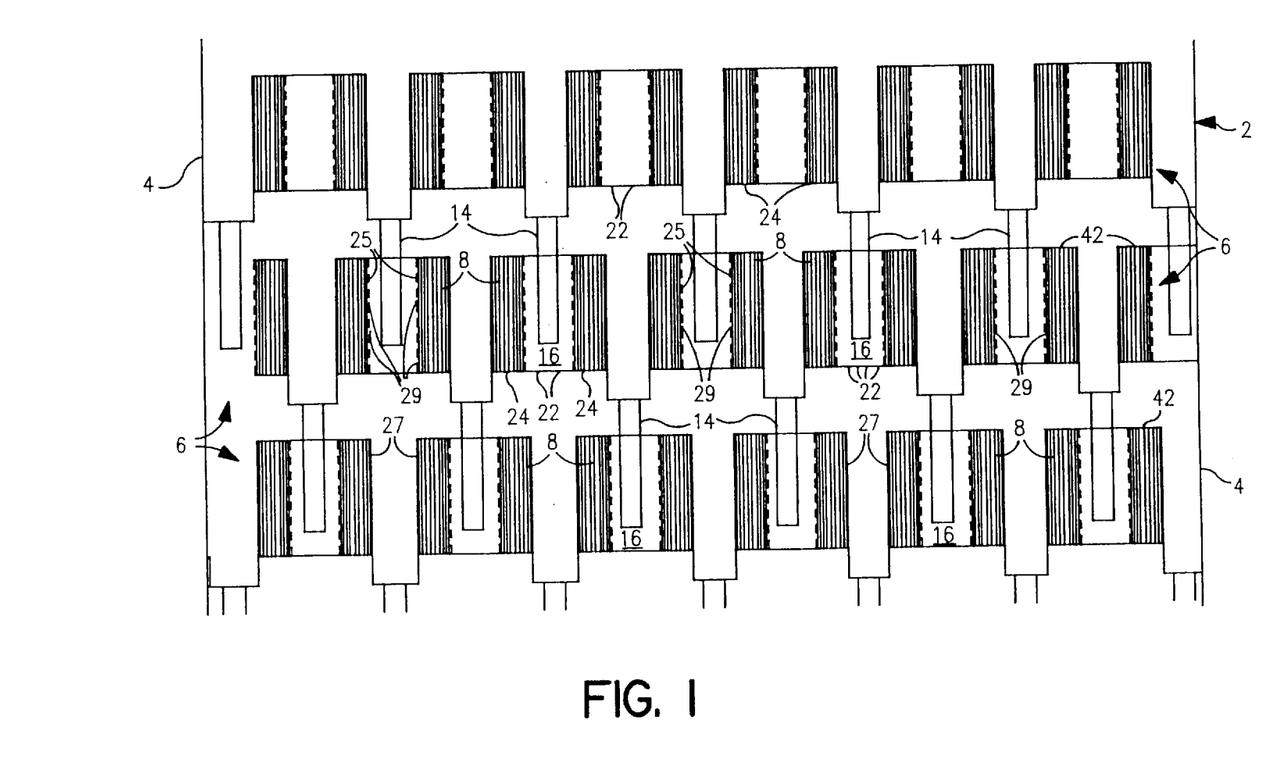
FIG. 1 is a schematic cross-sectional view of the interconnected tray design of the present invention.

One embodiment of the present invention is set forth in FIG. 1, which is a partial cut-away side view of a distillation column 2 having column side walls 4 that generally define a cylindrical column shape. The general description of the tray design of the present invention can be made with reference to FIG. 1, and a more detailed description of the mass flows within the column 2 is set forth with respect to the detailed figures that follow. Within the column 2 there are a plurality of separation trays 6. In accordance with the present invention, the liquid flows within the column 2 from one tray to a vertically lower tray through downcomers 14, which provide a passageway for the liquid to flow from an upper tray to a lower tray. The vapors rise up through the column 2 from one tray to the next vertically higher tray and enter into the higher tray through openings 22 through the bottom 24 of the tray 6. The trays 6 include co-current contacting sections 16, within which the rising vapors contact and entrain the liquid present on the lower portion of that tray 6. The vapors are separated from the entrained liquid within each tray 6 by means of the multiple de-entrainment devices 8. The liquid exits the de-entrainment devices 8 and flows into the downcomers 14 and into a vertically lower tray 6. The vapors exit the de-entrainment devices 8 and pass upward to a vertically higher tray 6. The de-entrainment devices 8 are defined by an inner side 25 and an outer side 27. The inner side 25 can be fabricated to be a perforated plate such that openings 29 provide a passageway for the vapors and entrained liquid to enter into the de-entrainment devices 8. Thus, the general components of the tray design of the present invention are present in FIG. 1. The vapors rise up through the column 2, entering a tray 6 through openings 22 in the bottom 24 of the tray and passing through the de-entrainment devices 8 and upward to the next tray 6. The liquid enters a tray 6 through the end of the downcomer 14 and is entrained by the rising vapors entering through the openings 22. At that point, the vapors and the entrained liquid flow in a co-current direction within the co-current contacting section 16 upwardly through the tray 6. The vapors and the liquid are separated within the tray 6 by means of the de-entrainment devices 8. The vapors exit the de-entrainment devices 8 and continue to rise up through the column 2, while the liquid exits the de-entrainment devices 8 and flows downward through the column 2.

Figure 2:
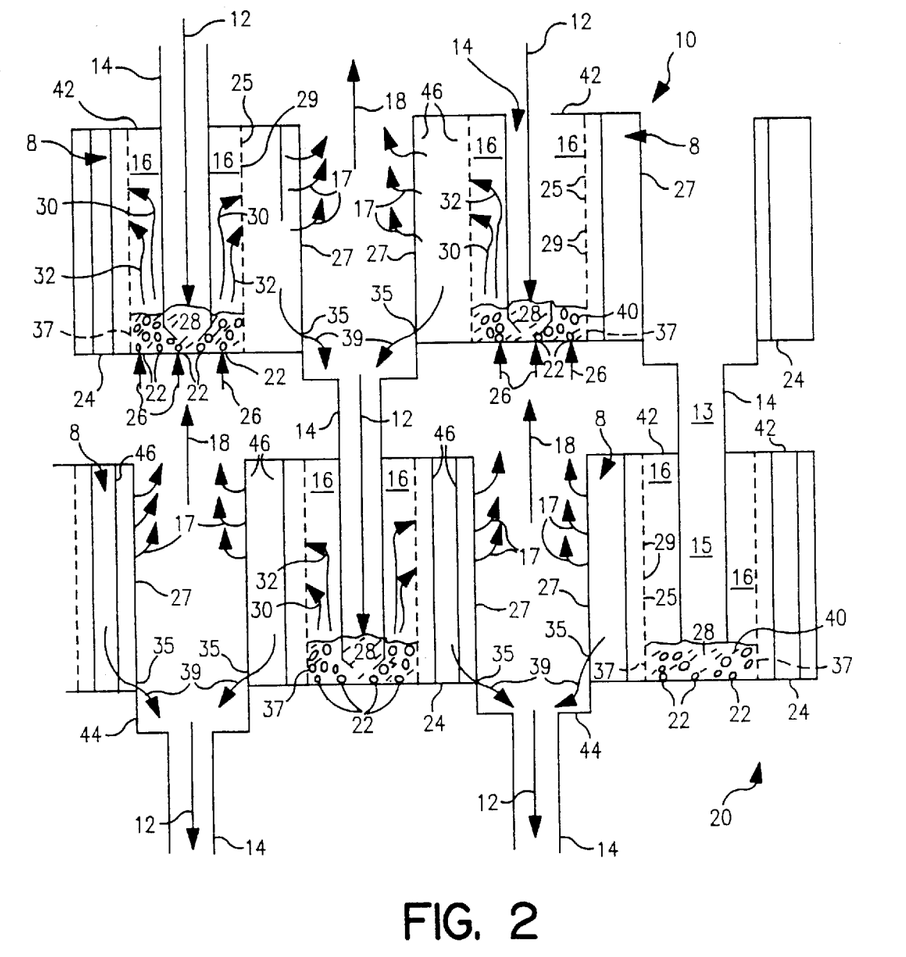
FIG. 2 is a schematic cross-sectional view, in detail with flow depicted, of the interconnected tray design of the present invention.

The tray design shown in FIG. 1 is shown in expanded detail in FIG. 2. Two trays are depicted in FIG. 2, an upper tray 10 and a lower tray 20. The various aspects of the tray design can be explained by following the flow of the vapor stream upward through the column and the flow of the liquid stream downward through the column. As seen with respect to upper tray 10, a liquid stream 12 flows down from the tray immediately above tray 10 through a series of downcomers 14, which define an upper downcomer section 13 located between two adjacent trays, such as trays 10 and 20, and a lower downcomer section 15 located within the lower tray.

As the liquid 12 reaches the bottom of the downcomer 14, it accumulates at the bottom of the downcomer 14 and flows into the bottom of a co-current contacting section 16. The co-current contacting section 16 is an area within the tray 10,20 through which both vapor and liquid flow in a co-current upward fashion. The vapor 18 rises from an adjacent lower tray and enters into the co-current contacting section through openings 22 through the bottom 24 of the tray 10,20. The flow of the vapor through the openings 22 is shown in FIG. 1 by lines 26. Thus, the vapor 18 passing from the lower tray 20 to the upper tray 10 is directed to enter tray 10 only through the openings 22 such that it immediately comes into contact with the liquid flowing out of the exit 28 of the downcomer 14. Within the bottom of the co-current contacting section 16 the velocity of the uprising vapors 26 causes the vapor stream to entrain the liquid to form an entrained liquid stream 30 and an entraining vapor stream 32. The entrained liquid and vapor streams 30, 32 flow upward through the co-current contacting section and flow along the outside of the downcomer 14. The downcomer 14 is preferably situated within the middle of the co-current contacting section 16 so that the up-ward, co-current flow of vapors and liquid is rather evenly distributed on both outer sides of the downcomer 14, although this need not be the case to practice the claimed inventions.

The entrained liquid and vapor streams 30, 32 must be de-entrained, or separated, within the tray so that the vapor can rise to the next vertically higher tray and so that the liquid can flow by way of gravity to the next vertically lower tray. This de-entrainment step is accomplished within the de-entrainment devices 8. The tray top 42 prevents the vapor and liquid streams 32,30 from leaving the tray without flowing through the de-entrainment device 8. As shown in FIG. 2, the entrained liquid stream 30 and the vapor stream 32 enter the de-entrainment device 8 by passing through openings 29 in the inner de-entrainment side 25. Within the de-entrainment device 8 the liquid stream 30 is de-entrained from the vapor stream 32. The vapor stream exits through the outer wall 27 of the de-entrainment device 8 as vapor stream 17, which collects and forms vapor stream 18 that exits the tray. In the embodiment shown in FIG. 2, the solid tray top 42 extends the length of the de-entrainment device 8. The liquid stream 39 is formed from the draining; of the collected liquid droplets within the de-entrainment device 8 and exits at the bottom 35 of the outer wall 27 of the de-entrainment device 8 to collect in the sump 44 of the downcomer and to form liquid stream 12 that flows through the downcomer 14. A liquid weir 37, that is preferably an integral part of the perforated plate that forms the inner side 25 of the de-entrainment device 8, is preferably used in the tray design to build up a pool of liquid 40 through which the vapor stream 26 passes and to prohibit the liquid from passing through the de-entrainment device 8 without first rising in a co-current fashion with the vapor stream within the co-current contacting section 16.

The particular design technology used to form the de-entrainment device 8 is not an aspect of the present invention as there a numerous commercially available technologies that can be chose from to form the de-entrainment device. In general, the de-entrainment devices 8 are vertically oriented mist eliminator devices. Their function is to remove entrained liquid droplets from the flowing gas stream and allow the liquid to drain, typically under the force of gravity, into the sump 44 of the downcomer.

In one embodiment, a "Chevron" type mist eliminator is used as the de-entrainment device 8, where the mist eliminator is formed from vertically parallel plates of corrugated metal with the axes of the corrugation running vertically. In use, the vapor stream 32 and liquid stream 30 traverse horizontally through the vertical plates and are forced to make successive turns at the bends of the corrugated plates, which are typically bent at 90° angles. The entrained liquid droplets, having a greater mass (and thus, inertia) are thrown from the vapor stream as that stream turns through the inside of the mist eliminator and the liquid droplets strike the plates. The liquid droplets then drain down the face of the plates due to gravity. Such a mist eliminator design for the de-entrainment device 8 is shown in FIG. 2 by lines 46, which represent the edges of the plates at their ends.

Figure 3:
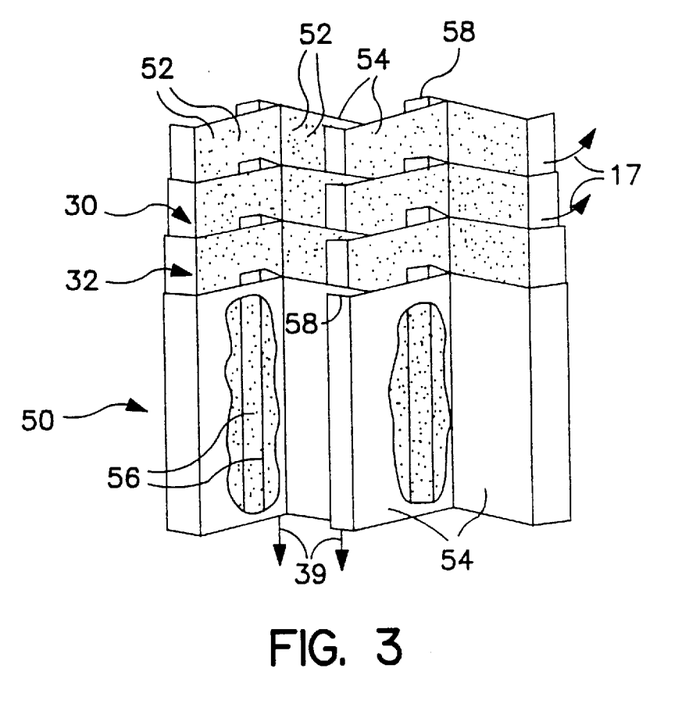
FIG. 3 is a partial view of a section of one embodiment of the de-entrainment device of the present invention.

Another embodiment of a mist eliminator is shown in FIG. 3 wherein there is shown just a portion of the mist eliminator that would be extended to fill the area on the tray for the de-entrainment device 8. In this mist eliminator 50 the vapor stream 32 and the entrained liquid stream 30 enter the mist eliminator 50 together and droplets 52 of the liquid collect on the corrugated plates 54. Due to gravity, the liquid droplets 52 flow downward over the surface of the plates 54 and form larger droplets 56. In this embodiment, there are specially formed "hooks" 58 that form a quiet zone for collection of the liquid and that inhibit the re-entrainment of the liquid droplets 52 in the vapor stream 32. Thus, the vapor stream 32 exits the mist eliminator 50 with a lower entrained liquid. content as vapor stream 17; the liquid stream 30 collects within the eliminator and exits as liquid stream 39.

The mist eliminators can take other specific designs, but the basic technology is the same: separation of the liquid droplets from the vapor stream by passing both streams through corrugated metal sheeting or plates. Typically, the metal sheets are made from steel. In the present invention, it is preferred to use a thin gauge metal plate in the mist eliminator design to decrease the overall weight of each tray. Other materials of construction, such as plastic or fiberglass materials could be used. Plastic materials may be beneficial in allowing for the design of smoother edges that could reduce the pressure drop across the de-entrainment device. Mist eliminators are commercially available from such companies as Koch Engineering Co. and the Otto H. York Company, Inc.

Various other technologies can be used as the de-entrainment devices 8 beyond the mist eliminators described above as the "Chevron" type systems. For instance, mesh pads constructed of woven metal threads can be used and are commercially available. Also, structured packings or grids can be used as the de-entrainment devices 8. combinations of these various technologies can also be employed, with the first device functioning as a coalescer of liquid droplets and the second device functioning as the collector of the coalesced droplets.

In certain embodiments the design of the area of the tray at the outlet 28 of the downcomer 14 may be modified to inhibit the flow of vapors 22 up through the downcomer 14 and thereby circumventing the co-current contacting section 16. In one embodiment, the downcomer 14 has an opening 28 that is a restricted orifice so that a higher head of pressure is established within the lower section 15 of the downcomer than in the co-current contacting section 16. Another embodiment would include a moving check valve positioned at the opening 28 of the downcomer 14 to prevent upward vapor flow. A check valve can be simply fashioned as a lightweight moving plate below the end of the downcomer that is free to move upward and seal off the downpipe should vapor attempt to flow upward through the downcomer. As another alternative, the openings 22 can be arranged so that they are not directly beneath the opening 28 of the downcomer 14.

Figure 4:
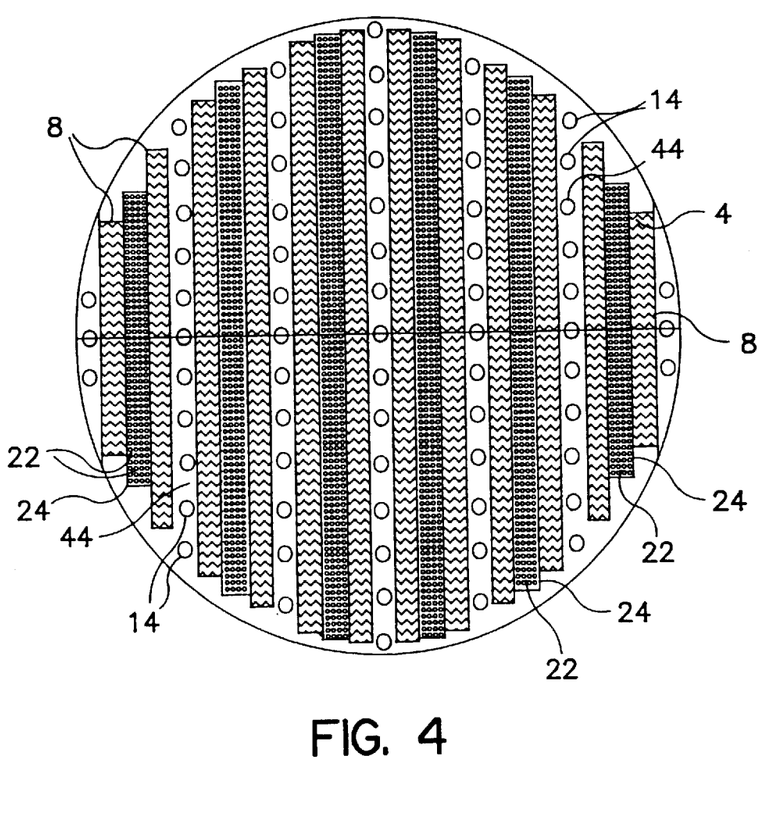
FIG. 4 is a top view of a cross-section of a column in which the tray design of the present invention is incorporated.

A top view of a tray designed in accordance with the present invention situated within the column wall 4 is shown in FIG. 4. The various components of the tray are seen as rows extending to the outer circumference of the column as defined by the wall 4. From this top view the liquid downcomers 14 are seen as circular sections extending downward from the sump 44 of the downcomers 14. Beside the downcomers 14 are the de-entrainment devices 8, shown here as corrugated lines of a demister device. Positioned between the de-entrainment devices 8 is the co-current contacting space 16, which is shown as the openings 22 through the bottom 24 of the trays. For convenience, the rows of the individual sections have not been shown to extend to the edges of the wall 4, although in practice these sections would extend to the wall 4 or preferably as close thereto as possible to thereby minimize any "dead space" within the column.

The principles of the inventive tray design of the present invention have been described with respect to the embodiments set forth in FIGS. 1–4. The optimum proportions and sizing of the various components of the tray design are within the skill of those in the art and depend on the specific column to which the invention is to be applied. However, in general, the following dimensions are applicable to most column designs. The height difference between the bottom 24 of a tray to the bottom 24 of the next tray is from about 18 to about 36 inches (about 46–92 cm). The distance between the top 42 of a tray and the bottom 24 of the next tray is from about 4 to about 8 inches (about 10–20 cm). The width of the area where the openings 22 are present in the bottom 24 of the tray is from about 6 to about 12 inches (about 15–30 cm). The width of the area of the de-entrainment devices 8 is from about 3 to about 6 inches (about 7.5–15 cm). The diameter of the lower section 15 of the downcomer 14 is about 2 to about 4 inches (about 5.0–10.0 cm). The width of the total co-current contacting section is about 8 to about 16 inches (about 20–41 cm). The height of the tray from its bottom 24 to its top 42 is about 12 to about 28 inches (about 30–71 cm). The width of the lower section 15 of the downcomer 14 is from about 2 to about 6 inches (about 5–15 cm).

Figure 5:
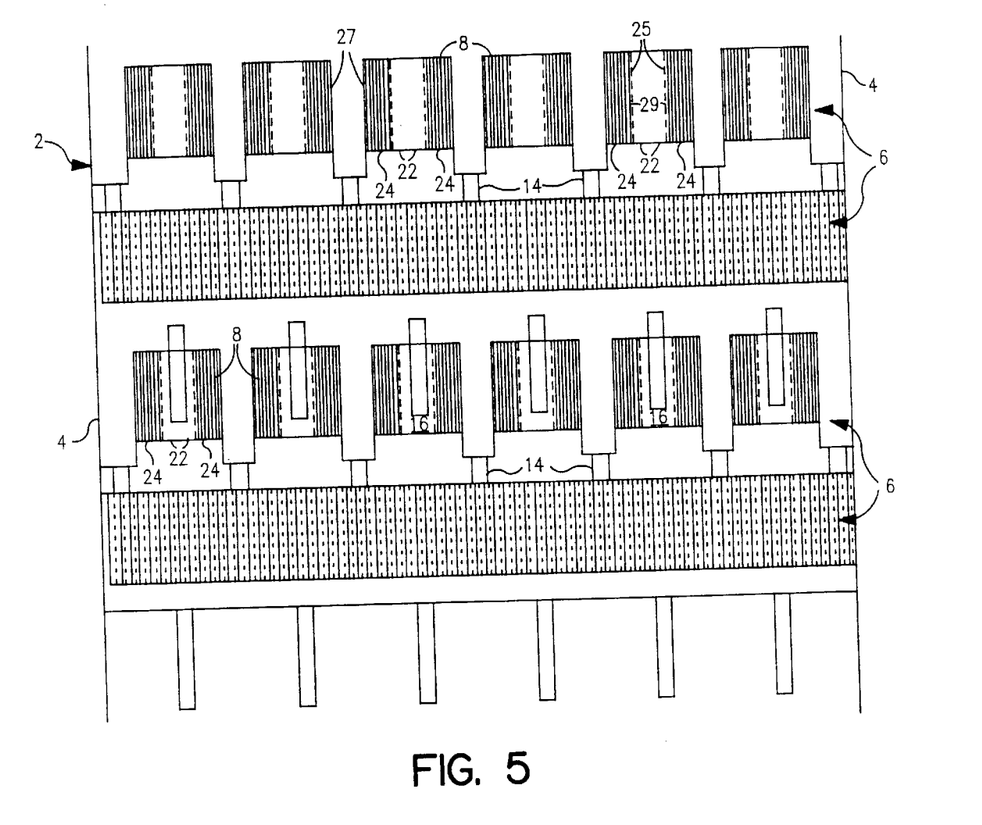
FIG. 5 is a schematic cross-sectional view of the interconnected tray design of the present invention using a 90° tray rotation.

Various modifications can be made to the arrangement of the trays 6 within the column 2. As shown in FIGS. 1 and 2, the trays 6 are aligned within the column 2. The trays 6 can be rotated within the column, such as is shown in FIG. 5, where the trays are staggered in a 90° off-set pattern. As shown in FIG. 5, the basic components of the trays are labeled as in FIG. 1.

What is claimed is:

1. A separation column for distilling or fractionating a feedstream, comprising:
    (a) a plurality of interconnected trays having a tray top and a tray bottom;
    (b) a plurality of co-current vapor and liquid contacting sections, located on the trays, comprising a volume in which vapors and liquid can be in concurrent contact;
    (c) a plurality of de-entrainment devices, located on the trays, for separating entrained liquids from a vapor stream, the de-entrainment devices having an inner and an outer side, the inner side being adjacent to the co-current contacting sections, and the inner and outer sides of the de-entrainment devices being permeable to vapors and liquids;
    (d) a plurality of liquid downcomers, having an upper portion and a lower portion, the upper portion of the liquid downcomer being capable of accepting liquid from the outer side of the de-entrainment device of a first tray, and the lower portion of the liquid downcomer being located within the co-current contacting section of a second tray that is vertically lower in the column from the first tray; and
    (e) vapor openings, located through the bottom of the trays at a point beneath the co-current contacting sections, through which vapors can pass into the co-current contacting section of a tray.

2. The distillation column of claim 1, further comprising a plurality of liquid weirs separating the co-current contacting sections from the de-entrainment devices.

3. The distillation column of claim 1, wherein the de-entrainment devices comprise vapor demisters.

4. The distillation column of claim 1, wherein the liquid downcomer further comprises means for preventing the flow of vapors up through the liquid downcomer, the vapor flow prevention means being located at a point proximate to the lower portion of the liquid downcomer.

5. The distillation column of claim 4 wherein the vapor flow prevention means for the liquid downcomers is a check valve.

6. The distillation column of claim 4 wherein the vapor flow prevention means for the liquid downcomers is a restriction orifice.

7. A method for operating a separation column, comprising the steps of:
    (a) providing a column comprising:
        (i) a plurality of inteconnected trays having a tray top and a tray bottom;
        (ii) a plurality of co-current vapor and liquid contacting sections, located on the trays, comprising a volume in which vapors and liquid can be in co-current contact;
        (iii) a plurality of de-entrainment devices, located on the trays, the de-entrainment devices having an inner and an outer side, the inner side being adjacent to the co-current contacting sections;
        (iv) a plurality of liquid downcomers, having an upper portion and a lower portion, the lower portion of the liquid downcomer being located within the co-current contacting section of a tray; and
        (v) vapor openings, located through the bottom of the trays at a point beneath the co-current contacting sections;
    (b) flowing liquid through a first liquid downcomer and into the co-current contacting section of a first tray;
    (c) directing vapors through the vapor openings of the first tray and into the co-current contacting section of the first tray, whereby the vapors entrain liquid within the co-current contacting section of the first tray to form an entrained fluid that travels upward through the first tray;
    (d) passing the entrained fluid through the de-entrainment device of the first tray to thereby separate at least a portion of the entrained liquid from the vapors;
    (e) directing the de-entrained liquid from the de-entrainment device of the first tray to a second liquid downcomer and into the co-current contacting section of a second tray that is vertically below the first tray; and
    (f) directing the de-entrained vapors from the de-entrainment device of the first tray to the co-current contacting section of a third tray that is vertically above the first tray.

8. The method of claim 7, further comprising building a pool of liquid in the co-current contacting section of the tray at a point adjacent to the vapor openings in the bottom of the tray.

9. The method of claim 7, wherein the de-entrainment devices comprise vapor demisters.

10. The method of claim 7, wherein the de-entrainment devices have an inner surface that is a wall having perforations through which vapors can pass, and further comprising passing the entrained fluid through the perforations in the wall of the inner surface of the de-entrainment devices.

11. The method of claim 7, wherein the first tray, the second tray, and the third tray are all aligned in the same rotation with respect to one another.

12. The method of claim 7, wherein the first tray is rotated in a horizontal direction with respect to the second tray.

* * * * *